(12) United States Patent
Vachhani et al.

(10) Patent No.: US 10,388,283 B2
(45) Date of Patent: Aug. 20, 2019

(54) SYSTEM AND METHOD FOR IMPROVING CALL-CENTRE AUDIO TRANSCRIPTION

(71) Applicant: Tata Consultancy Services Limited, Mumbai (IN)

(72) Inventors: Bhavikkumar Vachhani, Thane West (IN); Sunil Kumar Kopparapu, Thane West (IN)

(73) Assignee: Tata Consultancy Services Limited, Mumbai (IN)

(*) Notice: Subject to any disclaimer, the term of this patent is extended or adjusted under 35 U.S.C. 154(b) by 3 days.

(21) Appl. No.: 15/920,003

(22) Filed: Mar. 13, 2018

(65) Prior Publication Data

US 2019/0088260 A1  Mar. 21, 2019

(30) Foreign Application Priority Data

Sep. 21, 2017 (IN) .............................. 201721033500

(51) Int. Cl.
| | |
|---|---|
| *G10L 15/00* | (2013.01) |
| *G10L 15/26* | (2006.01) |
| *G10L 15/22* | (2006.01) |
| *G10L 15/08* | (2006.01) |
| *G10L 25/84* | (2013.01) |
| *G10L 25/63* | (2013.01) |
| *G06F 17/27* | (2006.01) |
| *G10L 15/32* | (2013.01) |
| *G10L 15/183* | (2013.01) |

(52) U.S. Cl.
CPC ............ *G10L 15/265* (2013.01); *G06F 17/27* (2013.01); *G10L 15/08* (2013.01); *G10L 15/22* (2013.01); *G10L 25/63* (2013.01); *G10L 25/84* (2013.01); *G10L 15/183* (2013.01); *G10L 15/26* (2013.01); *G10L 15/32* (2013.01); *G10L 2015/088* (2013.01); *G10L 2015/226* (2013.01)

(58) Field of Classification Search
CPC combination set(s) only.
See application file for complete search history.

(56) References Cited

U.S. PATENT DOCUMENTS

| | | | |
|---|---|---|---|
| 8,054,964 B2 | 11/2011 | Flockhart et al. | |
| 9,099,092 B2 | 8/2015 | Zhang et al. | |
| 2008/0228296 A1* | 9/2008 | Eilam | G06Q 10/10 700/94 |
| 2010/0179811 A1* | 7/2010 | Gupta | G10L 15/22 704/235 |

FOREIGN PATENT DOCUMENTS

CN          105427869          3/2016

* cited by examiner

*Primary Examiner* — Vu B Hang
(74) *Attorney, Agent, or Firm* — Finnegan, Henderson, Farabow, Garrett & Dunner LLP

(57) ABSTRACT

This disclosure relates generally to audio-to-text conversion for an audio conversation, and particularly to system and method for improving call-center audio transcription. In one embodiment, a method includes deriving temporal information and contextual information from an audio segment of an audio conversation corresponding to interaction of speakers, and input parameters are extracted from the temporal and contextual information associated with the audio segment. Language model (LM) and an acoustic model (AM) of an automatic speech recognition (ASR) engine are dynamically tuned based on the input parameters. A subsequent audio segment is processed by using the tuned AM and LM for the audio-to-text conversion.

15 Claims, 5 Drawing Sheets

|  | Agent | Customer | Agent | Customer | Agent | Customer | Agent | Customer | Agent |
|---|---|---|---|---|---|---|---|---|---|
| Speech segment | S1 | S2 | S3 | S4 |  |  | Sf2 | Sf-1 | Sf |
| Possible AM/LM for call transcription | AM1/LM1 | AM1/LM1 | AM1/LM1 | AM1/LM1 |  |  | AM1/LM1 | AM1/LM1 | AM1/LM1 |
|  | LM3 | AM4/LM4 | LM3 | AM1/LM1 | LM3 |  | LM3 |  | LM3 |
|  | AM5/LM5 |  |  | AM5/LM5 |  |  | AM5/LM5 | AM5/LM5 | AM5/M5 |
|  |  |  |  | LM6 |  |  |  |  |  |
|  | LM7 | LM7 | LM7 | LM7 |  |  | LM7 | LM7 | LM7 |
| Ideal call process in Call center | Welcome message: greetings and introduction | Introduction | Asking for help | Problem description | Understanding problem |  |  |  |  |
|  |  |  |  |  |  |  | Asking for putting call on hold |  |  |
|  |  |  |  |  |  |  | Get back on call with checking customer is there or not | Continuation of call | Good bye message based on time, festival etc. |

FIG. 5

SYSTEM AND METHOD FOR IMPROVING CALL-CENTRE AUDIO TRANSCRIPTION

PRIORITY CLAIM

This U.S. patent application claims priority under 35 U.S.C. § 119 to: India Application No. 201721033500, filed on Sep. 21, 2017. The entire contents of the aforementioned application are incorporated herein by reference.

TECHNICAL FIELD

This disclosure relates generally to audio-to-text conversion for an audio conversation, and more particularly to system and method for improving call-center audio transcription.

BACKGROUND

A consumer perception towards products and services is known to be influenced by quality of customer care operations offered for said products or services. Call centres providing said customer care services typically record the agent-customer voice transactions for different reason. One such reason is to extract data from the audio conversations that can be utilized to improve customer experience and/or enhance business opportunity of an enterprise. Typically, transcription of naturally spoken audio conversation between an agent and a customer is converted to text, and the text is then used to derive analytics for further use. The process of converting naturally spoken audio conversation is prone to errors in spite of the strides made in the area of automatic speech recognition (ASR).

SUMMARY

Embodiments of the present disclosure present technological improvements as solutions to one or more of the above-mentioned technical problems recognized by the inventors in conventional systems. For example, in one embodiment, a processor-implemented method for improving call-center audio transcription is provided. The method includes deriving temporal information and contextual information from one or more previous audio segments selected from a plurality of audio segments of the audio conversation corresponding to interaction of a plurality of speakers, via one or more hardware processors. Further the method includes extracting input parameters from the temporal information and the contextual information associated with the one or more first audio segments, via the one or more hardware processors. Furthermore, the method includes dynamically tuning at least one of a language model (LM) and an acoustic model (AM) of automatic speech recognition (ASR) engine based on the input parameters, via the one or more hardware processors, the ASR engine capable of performing the audio-to-text conversion. Moreover, the method includes processing at least a second audio segment by using the tuned AM and LM for the audio-to-text conversion via the one or more hardware processors, the second audio segment occurring subsequent to the one or more first audio segments in the audio conversation.

In another embodiment, a system for improving call-centre audio transcription is provided. The system includes at least one memory storing instructions and one or more hardware processors coupled to said at least one memory. The one or more hardware processors are configured by said instructions to derive temporal information and contextual information from one or more first audio segments selected from a plurality of audio segments of the audio conversation corresponding to interaction of a plurality of speakers. Further, the one or more hardware processors are configured by said instructions to extract input parameters from the temporal information and the contextual information associated with the one or more first audio segments. Furthermore, the one or more hardware processors are configured by said instructions to dynamically tune at least one of a language model (LM) and an acoustic model (AM) of an automatic speech recognition (ASR) engine based on the input parameters, the ASR engine capable of performing the audio-to-text conversion. Also, the one or more hardware processors are configured by said instructions to process at least a second audio segment by using the tuned AM and LM for the audio-to-text conversion, the second audio segment occurring subsequent to the one or more first audio segments in the audio conversation.

In yet another embodiment, a non-transitory computer-readable medium having embodied thereon a computer program for executing a method for improving call-centre audio transcription is provided. The method includes deriving temporal information and contextual information from one or more first audio segments selected from a plurality of audio segments of the audio conversation corresponding to interaction of a plurality of speakers. Further the method includes extracting input parameters from the temporal information and the contextual information associated with the one or more first audio segments. Furthermore, the method includes dynamically tuning at least one of a language model (LM) and an acoustic model (AM) of automatic speech recognition (ASR) engine based on the input parameters, the ASR engine capable of performing the audio-to-text conversion. Moreover, the method includes processing at least a second audio segment by using the tuned AM and LM for the audio-to-text conversion, the second audio segment occurring subsequent to the one or more first audio segments in the audio conversation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 5 is example representation of selection of respective AM and LM corresponding to a call-center audio transcription in accordance with some embodiments of the present disclosure.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Typically, in a call-centre environment, the conversation between a caller and a customer care executive (also, referred to as 'agent') is recorded. The recording of the conversation can be performed for various purposes, including but not limited to, improve call-centre services, observe agent's behaviour, extract usable analytics from the audio conversations to improve the customer experience or enhance the business opportunity of the enterprise, and so on. Typically, transcription of the naturally spoken audio conversation between the agent and the customer is converted to text, and the text is then used to derive analytics for further use. The conversion of audio text is performed through a process known as 'speaker diarization'. Herein, speaker diarization refers to a process of segmenting and clustering a speech recording into speaker-homogenous regions or segments according to speaker identity. A system capable of speaker diarization can automatically discriminate between multiple speakers in the audio track, and label said speakers accordingly. Said system is capable of speech/non-speech detection, overlap detection, resolution, and speaker identification using an unsupervised algorithm. An example of speaker diarization is described in FIG. 1A.

Figure 1A:
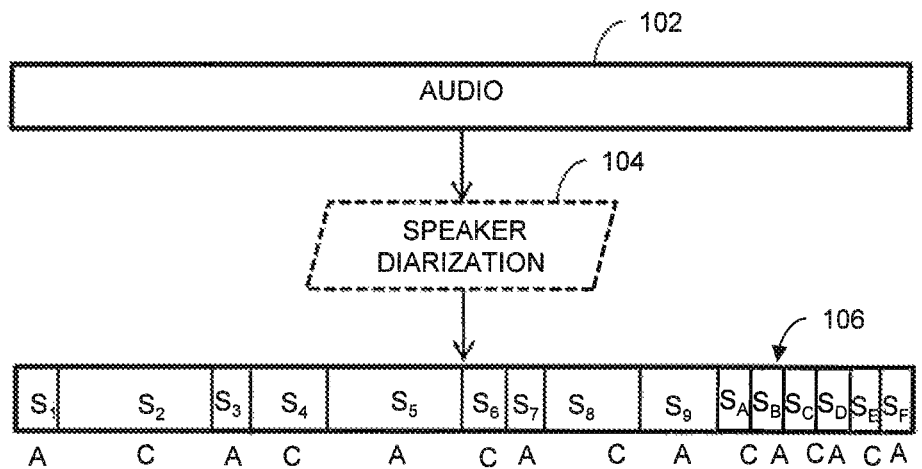
FIG. 1A illustrates an exemplary representation of a process of speaker diarization for call-center audio transcription, according to some embodiments of the present disclosure.

FIG. 1A illustrates an example representation of a process 100 of speaker diarization for call-centre audio transcription. The audio conversation between an agent and the customer may be stored in an audio file, such as audio file 102. Such an audio file 102 containing actual transaction between the agent and the customer can be split into agent spoken segments (marked as 'A' in FIG. 1) and customer spoken segments (marked as 'C' in FIG. 1A), through the speaker diarization at 104. As illustrated in the FIG. 1A, speaker diarization produces audio segments S1, S2, . . . Sf with a label of either "A" or "C" from the audio file 102, at 106.

Figure 1B:
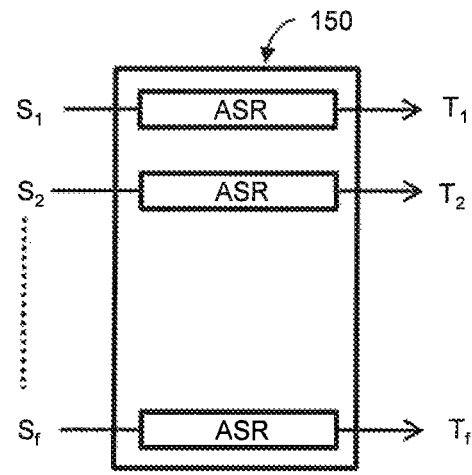
FIG. 1B illustrates processing of audio segments through an automatic speech recognition (ASR) system, according to some embodiments of the present disclosure.

Referring to FIG. 1B, each of these audio segments S1 through Sf are passed through an automatic speech recognition (ASR) system, for example a system 150, to convert said audio segments into corresponding text. For example, the audio segments S1, S2, . . . Sf are passed through the ASR system 150 to convert the said segments into text T1, T2, . . . Tf, respectively. The text T1, T2, . . . Tf are collated to obtain transcription of the initial audio conversation 102.

In various scenarios, the aforementioned process of converting the audio/speech into text has certain disadvantages. Such processes are prone to errors in spite of the strides made in the area of ASR. For example, an audio segment passed through a typical ASR system to perform ASR on utterance "I would like to eat mints" may output an irrelevant text string "I would like to eat mince". In general, typical ASR engines do not work all that well for conversational speech since different individuals have different speech patterns due to varied accents and ethnicity. Moreover, if case there is a background noise that is being recorded along with the utterance or audio, it may make it difficult for the system to differentiate between the utterance and the background noise.

Various embodiments disclosed herein provide method and system that overcomes aforementioned disadvantages of conventional systems, and provides an efficient ASR system. The disclosed system makes use of an ASR output of a previous audio segment (at time T) to dynamically tune the current ASR instance (or module) for converting the current audio segment into text. At this stage, the system extracts keyword from previous recognized text and adapt/tune language model (LM), and also detect emotion and/or speaking-rate and/or noise from audio segment and adapt/tune emotion and/or speaking-rate and/or noise dependent Acoustic model (AM). The system also makes use of different contextual information like standard call process followed by agent, meta-data, history of previous conversation, action items to be performed to adapt/tune the LM.

The above method(s) and system(s) are further described in conjunction with the following figures. It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

Figure 2:
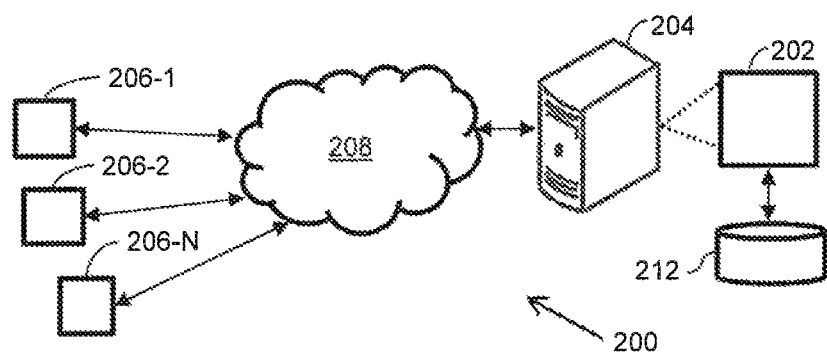
FIG. 2 is a networking environment implementing a system for improving call-center audio transcription according to some embodiments of the present disclosure.

FIG. 2 illustrates a network environment 200 implementing a system 202 for improving call-centre audio transcription, according to embodiments of the present subject matter. The system 202 for improving call-centre audio transcription, hereinafter referred to as the system 202, is configured for automatically converting speech to text for conversational speech. The system 202 utilizes customized Language model (LM) and/or tune the LM based on temporal and contextual information derived from the audio conversation corresponding to interaction of speakers, such as agent and customer. The system 202 may be embodied in a computing device, for instance a computing device 204. In an implementation, the system 202 is implemented within a call-centre. Alternatively, the system 202 can be implemented outside of the call centre, and can utilize the call-centre audio conversation for analytics. The call centre can be associated with an Information Technology (IT)/software firm, an e-commerce firm, or a specialized agency involved in such practice. In an embodiment, the system 202 may be implemented on a server.

Although the present disclosure is explained considering that the system 202 is implemented on a server, it may be understood that the system 202 may also be implemented in a variety of computing systems, such as a laptop computer, a desktop computer, a notebook, a workstation, a cloud-based computing environment and the like. In one implementation, the system 202 may be implemented in a cloud-based environment. It will be understood that the system 202 may be accessed by multiple users through one or more machines 206-1, 206-2 . . . 206-N, collectively referred to as machines 206 hereinafter, or applications residing on the machines 206. Examples of the machines 206 may include, but are not limited to, a portable computer, a personal digital assistant, a handheld device, a Smartphone, a Tablet Computer, a workstation and the like. The machines 206 are communicatively coupled to the system 202 through a network 208. Herein, the users of the machines 206 may include machines operable by or belonging to one or more of the agents, customer care executives, or any executive interested for analysing the audio conversation between the agents and the customers.

The system 202 is communicatively coupled, over a network 208, to user devices or machines, for example, the machine 206-1. The machine 206-1 may be further connected to another user device, for example a machine 206-2 over a local area network (LAN). In an alternative embodiment, the machines 206-1, 206-2 enable respective users (or agents) to communicate with the customers in a call-center environment. It is to be noted herein that the system 202 may enable in provisioning of a user interface, such as a graphic user interface (GUI), which may be used by the agent for communication with the customers.

In an embodiment, the network 208 may be a wireless or a wired network, or a combination thereof. In an example, the network 208 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 208 may interact with the system 202 through communication links.

As discussed above, the system 202 may be implemented in the computing device 204. Examples of the computing device 204 may include, but are not limited to, a hand-held device, a laptop or other portable computer, a tablet computer, a mobile phone, a PDA, a smartphone, and a desktop computer. The system 202 may also be implemented in a workstation, a server, and a network server. In an embodiment, the system 202 may be coupled to a data repository, for example, a repository 212. The repository 212 may store data processed, received, and generated by the system 202. In an alternate embodiment, the data repository 212 may be embodied within the system 202. The components and functionalities of the system 202 are described further in detail with reference to FIG. 3.

Figure 3:
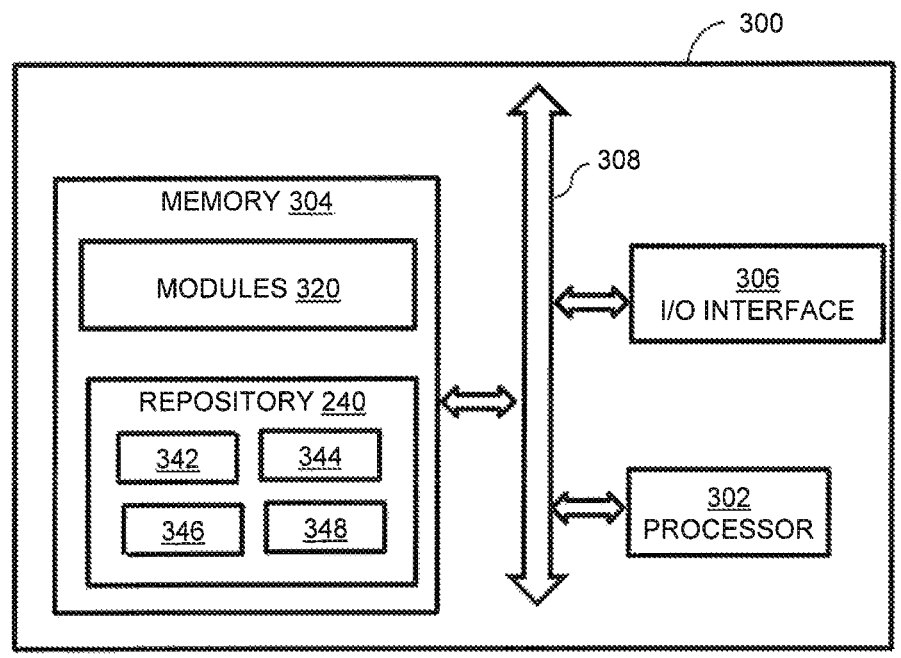
FIG. 3 illustrates a system implementation for improving call-center audio transcription in accordance with some embodiments of the present disclosure.

FIG. 3 illustrates a block diagram of a system 300 for improving call-centre audio transcription, in accordance with an example embodiment. The system 300 may be an example of the system 202 (FIG. 2). In an example embodiment, the system 300 may be embodied in, or is in direct communication with the system, for example the system 302 (FIG. 2). The system 300 includes or is otherwise in communication with one or more hardware processors such as a processor 302, at least one memory such as a memory 304, and an I/O interface 306. The processor 302, memory 304, and the I/O interface 306 may be coupled by a system bus such as a system bus 308 or a similar mechanism.

The hardware processor 302 may be implemented as one or more microprocessors, microcomputers, microcontrollers, digital signal processors, central processing units, state machines, logic circuitries, and/or any devices that manipulate signals based on operational instructions. Among other capabilities, the at least one processor 302 is configured to fetch and execute computer-readable instructions stored in the memory 304.

The I/O interface 306 may include a variety of software and hardware interfaces, for example, a web interface, a graphical user interface, and the like The interfaces 306 may include a variety of software and hardware interfaces, for example, interfaces for peripheral device(s), such as a keyboard, a mouse, an external memory, a camera device, and a printer. Further, the interfaces 306 may enable the system 302 to communicate with other devices, such as web servers and external databases. The interfaces 306 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 306 may include one or more ports for connecting a number of computing systems with one another or to another server computer. The I/O interface 306 may include one or more ports for connecting a number of devices to one another or to another server.

The memory 304 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 304 includes a plurality of modules 320 and a repository 340 for storing data processed, received, and generated by one or more of the modules 320. The modules 320 may include routines, programs, objects, components, data structures, and so on, which perform particular tasks or implement particular abstract data types. Additionally, the other modules 320 may include programs or coded instructions that supplement applications and functions of the system 300. The repository 340, amongst other things, includes a system database 342 and other data 344. The other data 344 may include data generated as a result of the execution of one or more modules in the modules 320. Additionally, the repository 340 may include contextual information 346 and temporal information 348. The details of the contextual information and the temporal information are explained further in the description below.

Herein, the memory, for example the memory 304 and the computer program code configured to, with the hardware processor for example the processor 302, cause the system 300 to perform various functions described herein under. According to the present subject matter, the system 300 is configured to receive or obtain at least one audio segment corresponding to the conversation between a plurality of speakers. In an implementation, the plurality of speakers may include at least one call-centre agent and at least one customer. Herein, it will be noted that although the description is explained by considering the conversation between a call-centre agent and a customer for the corresponding call-centre, the embodiments described herein are equally applicable for transcription of any call involving two or more speakers. Hence, the inclusion of the call-centre agent and the customer for the purpose of explanation should not be construed as limiting to the embodiments.

The audio conversation corresponding to interaction of the plurality of speakers may be in form of an audio file. The audio conversation file includes a plurality of audio segments, each corresponding to one of the plurality of speakers. For instance, as described with reference to FIGS. 1A and 1B, each audio segment may be spoken by either the agent or the customer.

The system 300 is configured to facilitate speech-to-text conversion of said audio segments by making use of an ASR output of one or more first audio segments at time instance, for example T, to dynamically tune the ASR instance, and convert the current audio segment (for example at time instance T+1) into text. Herein, the one or more first audio segments refer to previous or past audio segments that may have occurred/appeared prior to the a current audio segment under processing in the audio conversation, hence the terms 'first audio segments' may be used interchangeably with the term 'previous audio segments' throughout the description. In order to utilize the ASR output of previous audio segments, the system 300 utilizes temporal information and the contextual information derived from the previous audio segments and tune and/or adapt various LMs and/or AMs. Herein, the term 'ASR output' refers to output of an ASR engine. The ASR engine includes a plurality of language models (LMs) and a plurality of acoustic models (AMs). Herein, it will be noted that the system utilizes an AM for processing of an audio segment when information regarding acoustic signal such as emotion, noise, speaking rate, and so on is derived from the first audio signals. However, an LM can be utilized for processing of an audio segment when the textual information is available/derived from the previous/first audio segments. Accordingly, based on the availability of the extracted information, the system can tune AM and/or LM.

In an embodiment, the system 300 extracts input parameters from the temporal information and the contextual information of the current audio segment. The temporal information includes input parameters extracted from text and input parameters extracted from audio segments. Examples of input parameters extracted from text may include, but are not limited to, specific keywords obtained from sentiment analysis or otherwise. In an embodiment, the sentiment analysis is performed on previously recognized text. Upon applying sentiment analysis on the previously recognized text, the system 300 may identify the emotional state of the speaker, for instance, the emotional state of the speaker may be happy, sad, angry, and so on. The identified emotions allow the system 300 to select an appropriate AM that is able to recognize the conversational audio in an effective manner. The input parameters extracted from text are utilized for tuning and/or adapting the LM. The input parameters extracted from audio segments may include but are not limited to emotion or emotional state of customer, speaking rate, noise, and so on. The system 300 extracts the input parameters from the previous and present/current audio segments to dynamically tune the AM.

The contextual information may include standard call process followed by agent or companies, location, time of the call, meta-data of the customer, history of previous conversations or interaction between the agent and the customer, agent-customer interaction though other communication channel (such as email, live chat and so on), action items to be performed, summary of the call, and the like. The contextual information is utilized to adapt and/or tune the corresponding LM and AM. For example, considering that the audio segments, for instance segments S1, S3 . . . Sn may correspond to the agent speech, the system 300 can incorporate specific LM created for speech recognition of respective agent.

In another example, the standard call process followed by agent or companies may be used for extracting contractual information and tuning the LM. An example of a standard call process followed by agent or companies is: 1. Welcoming greetings based on timing of the call 2. Hello and thank you for calling, [Company Name], where [state your short company slogan] 3. How may I help you today 4. Before putting on hold ask for permission: Can I put you on hold for few seconds? 4. Goodbye message with closing greeting based on time. Based on the standard call-process, the system 300 can adapt/create an LM and feed the LM to ASR for using some standard call centre process for better performance.

Additionally or alternatively, the LM can be adapted based on customer's previous interaction with the call-centre and/or customer meta-data with the following consideration: The system 300 may store multiple previous call transcribed through an ASR engine, and/or manually transcribed summary of the conversation written by agent, and/or further action plan to resolve the issues, and so on. The system 300 may extract keywords from the previously stored call transcription, and based on meta-data extract the information such as name of the customer, current location, address, purchase history, and so on. In an embodiment, there may be different combinations of AMs and LMs that can be selected based on the temporal and the contextual information. An example table describing various AM and LM models for use by the ASR engine based on temporal and contextual information, is described further with reference to FIG. 5

The system 300 dynamically tunes and/or adapts at least one of the LMs and the AMs based on the input parameters. In an embodiment, the system 300 selects different combinations of AM and/or LM based on the extracted temporal and contextual information. In an embodiment, the system 300 assigns score to each audio segment S1, S2 . . . , Sf against different AM and/or LM and, based on the score selects the LM and/or AM as an output so that the ASR can perform better in converting the current audio segment into text. In an embodiment, the system 300 may select an AM and/or LM having score greater than or equal to a threshold value of score. For instance, for each combination of AM and/or LM, the system may compute an ASR likelihood score and one text output. So, if there are N combinations of AM/LM, there are N scores and text as output, namely (Score1, T1), (Score2, T2), and so on. The system may select the text corresponding to maximum score as the text matching with the audio segment. For example, if ScoreK is the maximum among all scores, Score1-ScoreN, then the text TK corresponding to the ScoreK may be the selected text.

The system 300 processes a second audio segment by using the tuned AM and LM. Herein, the second audio segment refers to an audio segment occurring subsequent to the one or more first audio segments in the audio conversation. Hereinafter, the term second audio segment and 'subsequent audio segment' may be used interchangeably throughout the description. The system 300 makes use of the ASR output of the previous segment to dynamically tune the ASR instance to convert the current audio segment into text. More specifically, the text output of audio segment S1 (namely T1) is used to dynamically tune the ASR before it can convert the audio segment S2 into text. The processing of the dynamic tuning of the subsequent audio segment by using the tuned AM and LM, is described further with reference to FIGS. 4A and 4B.

Figure 4A:
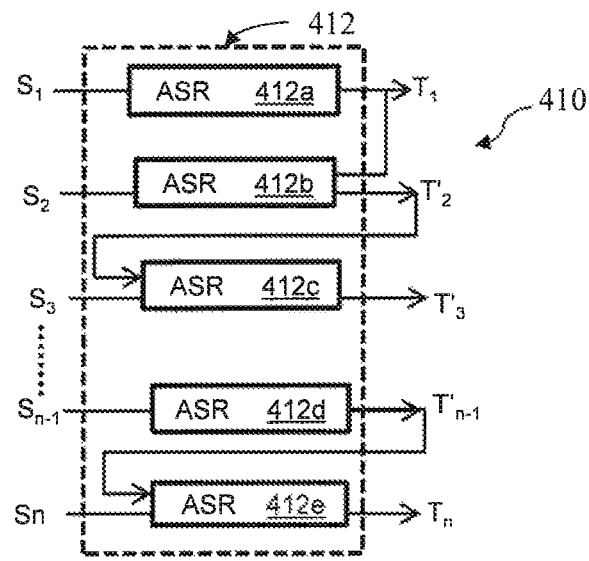
FIGS. 4A and 4B illustrate an example representation of dynamic tuning of an audio segment using tuned AM and/or LM according to some embodiments of the present disclosure.
Figure 4B:
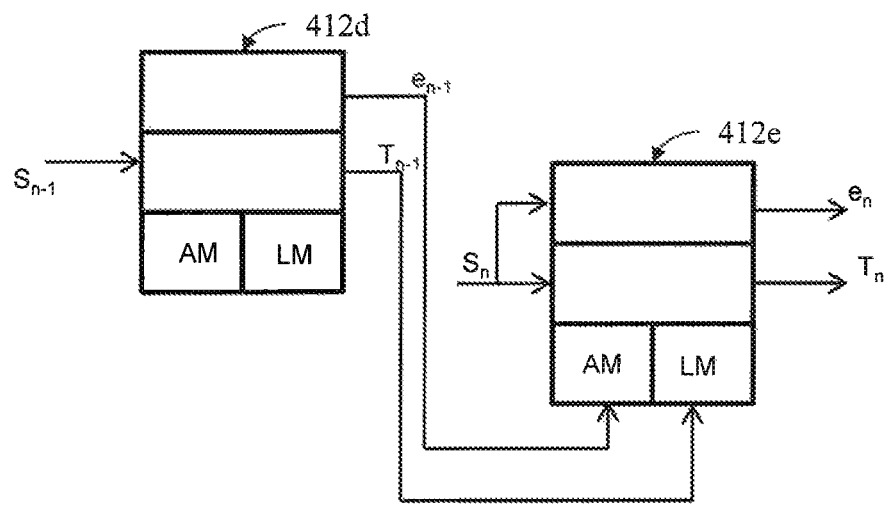

Referring collectively to FIGS. 4A and 4B, an example representation 410 of dynamic tuning of the subsequent audio segment using tuned AM and/or LM, is illustrated and described in accordance with an example embodiment.

As illustrated in FIG. 4A, the system, for example, the system 300 (FIG. 3) includes an ASR engine 412. The system 300 utilizes ASR output of the previous audio segment to dynamically tune the current ASR output and convert the current audio segment into text. More specifically, the text output of an audio segment is used to dynamically tune the ASR engine before it can convert the subsequent audio segment into text. For example, the audio segment S1 is input to the ASR 412a, and the processed output of the ASR 412a is the text output T1. Now, in order to process (convert audio segment to text) the subsequent audio segment S2 into text, the system 300 tunes the ASR engine 412b according to the contextual information and the textual information associated with the audio segment S1.

For example, as illustrated in FIG. 4B, the audio segment Sn−1 (or S1 in this example) is fed to the ASR engine 412n. The ASR 412n is shown to include an AM and a LM. The ASR engine can be considered to be driven by AMs and the LMs. Herein, the system utilizes the recognized emotion en−1 for the segment Sn−1 to tune the AM and the recognized text Tn−1 to tune the LM to recognize the segment Sn. The recognition of emotion en−1 enables the use of suitable and better AM to recognize the audio segment Sn while the text Tn−1 enables changing the LM dynamically so that one can better anticipate Tn.

In a first instance, i.e. for processing of audio segment S1, the AM and LM can be selected based on basic information related to the call centre conversation. For example, the AM and LM for processing the audio segment S1 for a given call can be selected based on the spoken language, for instance, English, Indian English, American English, Chinese, or any other language. Such an AM and LM that is utilized for processing of the first audio segment of an audio can be referred to as a generic AM and LM. Upon processing of the audio segment Sn−1 by the ASR 412, the system 300 derives textual information illustrated as Tn−1 and an contextual information illustrated as en−1. The textual information and the contextual information are provided as input to the AM model and the LM model of ASR engine 412 for tuning them. For example, the recognized emotion for the audio segment Sn−1 is used to tune the AM, and the recognized text Tn−1 is used to tune the LM to recognize the audio segment Sn. The recognition of emotion en−1 enables the use of suitable and better AM to recognize the audio segment Sn while the text Tn−1 enables changing the LM dynamically so that Tn can be anticipated better.

The system provides the text output Tn−1 corresponding to the audio segment Sn−1 of the ASR 412 as input to the current ASR engine, in addition to the audio segment Sn. The ASR engine 412 is tuned according to the contextual information and the textual information derived from the audio segment Sn. The system 300 provides the processed subsequent audio segment to an automatic speech recognition (ASR) engine for the audio-to-text conversion. Herein, processing the subsequent audio segment includes converting the speech from audio segment into text.

Referring to FIG. 5, an example representation of selection of respective AM and LM corresponding to a call-centre audio is illustrated, in accordance with an example embodiment. The call centre audio conversation includes interaction between a call centre agent/executive and a customer. The audio segments uttered by the call-centre agent are marked as S1, S3, Sf−2, Sf, and so on, and those spoken by customer are labelled S2, S4, Sf−1, and so on. The audio conversation is split into various audio segments spoken by each of the agent and the customer. Based on the contextual information and the temporal information associated with the conversation, it may be derived that certain segments such as S1 may be a welcome message to greet a customer. For example, this particular call-centre may have a standard way of greeting the customers such that a greeting message may include greeting and introduction about the agent, as is represented by S1 in the message. Followed by the greeting message, the customer may be given a chance to introduce himself/herself, as indicated at S2. The agent can ask for the kind of assistance the customer is looking for, as shown at S3. The customer can describe the issue, for example, in audio segment S4. In this manner, the conversation can be continued as described in FIG. 5.

The system, for example, the system 300 (FIG. 3) may extract keywords from the previously stored call transcription, and based on meta-data extract the information such as name of the customer, current location, address, purchase history, and so on. In an embodiment, there may be different combinations of AMs and LMs that can be selected based on the temporal and the contextual information for each audio segment. For example, for the audio segment S1, based on the input parameters derived from the temporal information and contextual information associated with the audio segment S1, the system can dynamically tune or select at least one of a language model LM and AM. Various combinations of the LM and/or AM that can be selected for processing the audio segment S1 may include AM1/LM1, */LM3, AM5/LM5, */LM7, and so on. Here, in */LM, asterisk (*) represents previous AM used for speech-to-text conversion. Examples of selection of AM and LM for various audio segments is described with reference to Table 1 below:

TABLE 1

| AM1/LM1 | Generic LM and AM | Fixed |
|---|---|---|
| AM2/LM2 | Location dependent LM and AM (Context) | On the fly based on location (dynamic) |
| AM3 | LM for agent build using some standard process defined by XYZ company (Context) | Fixed for company |
| AM4/LM4 | Customer specific LM based on previous conversation and adapted AM (Context) | On the fly based on customer identification (dynamic) |
| AM5/LM5 | Agent specific LM based on previous conversation and adapted AM (Context) | On the fly based on who is attending that call(dynamic) |
| LM6 | Keyword specific LM (Context and/or temporal) | On the fly (dynamic) |
| AM7 | Emotion dependent AM (temporal) | On the fly based on emotion (dynamic) |
| AM8 | Noise dependent AM (Context) | Fixed for one acoustic environment |

As described previously, an AM is utilized for processing of an audio segment used when there is certain information regarding audio such as emotion, noise, speaking rate, and so on. However, an LM can be utilized for processing of an audio segment when the textual information is available/derived from the audio segment. Accordingly, based on the availability of extracted information, the system can tune AM and/or LM.

In an implementation, the system 300 may be caused to assign an ASR likelihood score to each of the available options and/or combinations of AMs and LMs, and based on said scoring the system is caused to select a combination of AM and/or LM that can be utilized for processing the audio segment.

Figure 6:
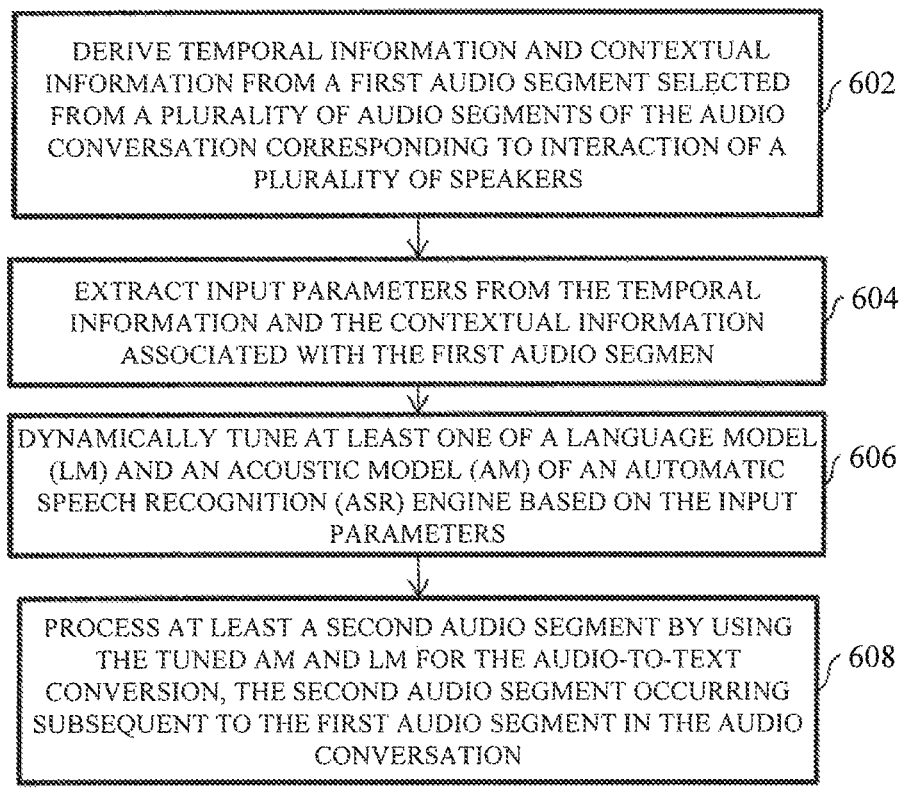
FIG. 6 illustrates a flowchart of a method for improving call-center audio transcription, in accordance with an example embodiment.

FIG. 6 illustrates a flowchart of a method 600 for improving call-centre audio transcription, in accordance with an embodiment. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communication network. The order in which the method 600 is described is not intended to be construed as a limitation, and any number of the described method blocks can be combined in any order to implement the method 600, or an alternative method. Furthermore, the method 400 can be implemented in any suitable hardware, software, firmware, or combination thereof.

In an embodiment, the method 600 depicted in the flow chart may be executed by a system, for example, the system 300 of FIG. 3. In an example embodiment, the system 300 may be embodied in a computing device, for example, the computing device 204 (FIG. 1).

A conversation, for example amongst a plurality of speakers may include audio segments spoken by various speakers. For example, in case of call-centre conversation, the audio conversation may be spoken between a call centre executive/agent and a customer. Each of the agent and the customer's spoken audio segments are segregated by a process call speaker diarization as explained with reference to FIG. 1. A temporal information and contextual information is derived from one or more first audio segments selected from the audio segments of the audio conversation corresponding to the interaction of said plurality of speakers, at 602. The temporal information may include, for example, keywords, emotion, speaking rate, and noise information associated with the conversation. The contextual information may include, for example, standard call process followed by agent or companies, location, time of the call, meta-data of the customer, history of previous conversation, agent-customer interaction though other communication channel (email, live chat, and so on), action items to be performed, summary of the call.

At 604, the method 600 includes extracting input parameters from the temporal information and the contextual information associated with the first audio segment. At 606, the method 600 includes dynamically tuning at least one of a LM and AM of ASR engine based on the input parameters. In an embodiment, the input parameters include textual information parameters and audio information parameters of the first audio segment. The textual information parameters extracted from the temporal and contextual information are used to dynamically tune the LM. The audio information parameters extracted from the temporal and contextual information are used to dynamically tune the AM.

At 608, the method 600 includes processing at least a second audio segment by using the tuned AM and LM. Herein, the second audio segment refers to the audio segment occurring subsequent to the first audio segment in the audio conversation. The processed subsequent audio segment to the ASR engine for the audio-to-text conversion.

Various embodiments provide method and system for improving call-centre audio transcription. An audio conversation, for example, between a call-centre agent and a customer into, can be split into various audio segments based on the speaker of said audio segments (for example, into agent-spoken segments and the customer-spoken segments). The system is further capable of identifying contextual information and temporal information from the audio segments and based on said information, the system tunes a subsequent instance of the ASR engine. Meaning thereby, that a subsequent audio segment is processed by the ASR engine having tuned LM and AM corresponding.

The system utilizes ASR output of a previous segment at time 'T' to dynamically tune the ASR instance to convert the current audio segment into text. At this stage the system extract keywords from previous recognized text and adapts and/or tunes LM. Additionally the system detects emotion and/or speaking-rate and/or noise from audio segment and adapts and/or tunes an emotion and/or speaking-rate and/or noise dependent AM. The system makes use of different contextual information like standard call process followed by agent, meta-data, history of previous conversation, action items to be performed to adapt/tune the LM. The system can used various combinations of AM/LM based on the temporal information and the contextual information derived from the previous audio segment. In an embodiment, the system can assign scores to each of the audio segments against the different AM/LM, and accordingly can select AM/LM for processing the audio segment by the ASR engine. A significant outcome of the disclosed method is that the disclosed method enables selecting of suitable AM/LM based on scoring as per the temporal information and the contextual information, thereby facilitating in selecting best AM/LM for converting the current audio segment into text. Herein, since both the temporal and contextual information are utilized for tuning and/or adapting the ASR engine for processing of every audio segment, the quality of call-centre transcription is improved from the existing ASR systems.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for improving call centre audio transcription, the method comprising:
   deriving temporal information and contextual information from one or more first audio segments selected from a plurality of audio segments of the audio conversation corresponding to interaction of a plurality of speakers, via one or more hardware processors;
   extracting input parameters from the temporal information and the contextual information associated with the one or more first audio segments, via the one or more hardware processors;
   dynamically tuning at least one of a language model (LM) and an acoustic model (AM) of an automatic speech recognition (ASR) engine based on the input parameters, via the one or more hardware processors, the ASR engine capable of performing the audio-to-text conversion;
   processing at least a second audio segment by using the tuned AM and LM for the audio-to-text conversion via the one or more hardware processors, the second audio segment occurring subsequent to the one or more first audio segments in the audio conversation;
   applying the input parameters to a plurality of LMs and a plurality of AMs;
   obtaining ASR likelihood scores for each of the plurality of LMs and AMs corresponding to the each audio segment of the plurality of audio segments, the ASR likelihood scores indicative of processing capability of the respective LMs and AMs combination for the each audio segment; and
   selecting at least one of the LM/AM combination of the ASR engine based on the ASR likelihood score.

2. The method of claim 1, wherein the plurality of speakers comprises at least an agent and a customer.

3. The method of claim 1, wherein the input parameters comprises textual information parameters and audio information parameters of the one or more first audio segments.

4. The method of claim 3, wherein the textual information parameters extracted from the temporal and contextual information are used to dynamically tune the LM.

5. The method of claim 3, wherein the audio information parameters extracted from the temporal and contextual information are used to dynamically tune the AM.

6. The method of claim 1, wherein the temporal information comprises keywords, emotion, speaking rate, and noise information associated with the conversation.

7. The method of claim 1, wherein the contextual information comprises standard call process followed by agent, customer-care companies, location, time of the call, metadata of the customer, history of previous conversation, agent-customer interaction though other communication channel, action items to be performed, and summary of the call.

8. A system for improving call-center audio transcription, the system comprising:
   at least one memory storing instructions; and
   one or more hardware processors coupled to said at least one memory, wherein said one or more hardware processors are configured by said instructions to:
      derive temporal information and contextual information from one or more first audio segments selected from a plurality of audio segments of the audio conversation corresponding to interaction of a plurality of speakers;
      extract input parameters from the temporal information and the contextual information associated with the one or more first audio segments;
      dynamically tune at least one of a language model (LM) and an acoustic model (AM) of an automatic speech recognition (ASR) engine based on the input parameters, the ASR engine capable of performing the audio-to-text conversion;
      process at least a second audio segment by using the tuned AM and LM for the audio-to-text conversion, the second audio segment occurring subsequent to the one or more first audio segment in the audio conversation;
      apply the input parameters to a plurality of LMs and a plurality of AMs;
      obtain ASR likelihood scores for each of the plurality of LMs and AMs corresponding to the each audio segment of the plurality of audio segments, the ASR likelihood scores indicative of processing capability of the respective LMs and AMs combination for the each audio segment; and
      select at least one of the LM/AM combination of the ASR engine based on the ASR likelihood score.

9. The system of claim 8, wherein the plurality of speakers comprises at least an agent and a customer.

10. The system of claim 8, wherein the input parameters comprises textual information parameters and audio information parameters of the one or more first audio segments.

11. The system of claim 10, wherein the textual information parameters extracted from the temporal and contextual information are used to dynamically tune the LM.

12. The system of claim 10, wherein the audio information parameters extracted from the temporal and contextual information are used to dynamically tune the AM.

13. The system of claim 8, wherein the temporal information comprises keywords, emotion, speaking rate, and noise information associated with the conversation.

14. The system of claim 8, wherein the contextual information comprises standard call process followed by agent, customer-care companies, location, time of the call, metadata of the customer, history of previous conversation, agent-customer interaction though other communication channel, action items to be performed, and summary of the call.

15. A non-transitory computer-readable medium having embodied thereon a computer program for executing a method for improving call-center audio transcription, the method comprising:

deriving temporal information and contextual information from one or more first audio segments selected from a plurality of audio segments of the audio conversation corresponding to interaction of a plurality of speakers, via one or more hardware processors;

extracting input parameters from the temporal information and the contextual information associated with the one or more first audio segments, via the one or more hardware processors;

dynamically tuning at least one of a language model (LM) and an acoustic model (AM) of an automatic speech recognition (ASR) engine based on the input parameters, via the one or more hardware processors, the ASR engine capable of performing the audio-to-text conversion;

processing at least a second audio segment by using the tuned AM and LM for the audio-to-text conversion via the one or more hardware processors, the second audio segment occurring subsequent to the one or more first audio segments in the audio conversation;

applying the input parameters to a plurality of LMs and a plurality of AMs;

obtaining ASR likelihood scores for each of the plurality of LMs and AMs corresponding to the each audio segment of the plurality of audio segments, the ASR likelihood scores indicative of processing capability of the respective LMs and AMs combination for the each audio segment; and selecting at least one of the LM/AM combination of the ASR engine based on the ASR likelihood score.

* * * * *